US010448435B2

(12) United States Patent
Nylander et al.

(10) Patent No.: US 10,448,435 B2
(45) Date of Patent: Oct. 15, 2019

(54) SETTING UP A DEDICATED BEARER IN A RADIO COMMUNICATION NETWORK

(71) Applicant: TELEFONAKTIEBOLAGET LM ERICSSON (PUBL), Stockholm (SE)

(72) Inventors: Tomas Nylander, Värmdö (SE); Ann-Christine Eriksson, Enköping (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/739,067

(22) PCT Filed: Jun. 25, 2015

(86) PCT No.: PCT/SE2015/050744
§ 371 (c)(1),
(2) Date: Dec. 21, 2017

(87) PCT Pub. No.: WO2016/209131
PCT Pub. Date: Dec. 29, 2016

(65) Prior Publication Data
US 2018/0192452 A1     Jul. 5, 2018

(51) Int. Cl.
*H04W 76/10*     (2018.01)
*H04W 76/12*     (2018.01)
(Continued)

(52) U.S. Cl.
CPC ........... *H04W 76/10* (2018.02); *H04W 76/12* (2018.02); *H04L 61/1511* (2013.01);
(Continued)

(58) Field of Classification Search
None
See application file for complete search history.

(56) References Cited

U.S. PATENT DOCUMENTS

| 2012/0099429 A1 | 4/2012 | Ludwig et al. |
| 2013/0016658 A1* | 1/2013 | Lovsen .................. H04W 76/19 370/328 |

(Continued)

FOREIGN PATENT DOCUMENTS

| WO | 2011060974 A1 | 5/2011 |
| WO | 2012172384 A1 | 12/2012 |
| WO | 2015124210 A1 | 8/2015 |

OTHER PUBLICATIONS

3GPP TS 23.401 V13.2.0, 3rd Generation Partnership Project; Technical Specification Group Services and System Aspects; General Packet Radio Service (GPRS) enhancements for Evolved Universal Terrestrial Radio Access Network (E-UTRAN) access (Release 13), Mar. 2015.

*Primary Examiner* — Michael J Moore, Jr.
(74) *Attorney, Agent, or Firm* — Baker Botts, LLP

(57) ABSTRACT

The present disclosure relates to a method performed in a communication network comprising a cellular Radio Access Network (RAN), a Core Network (CN) and an Application Function (AF). The method comprises receiving, via a user plane bearer, from a service client in a radio device connected to the RAN, at least one address information element of at least one server of a service provider. The method also comprises forwarding the at least one address information element to the AF for initiating setting up of a CN end of a dedicated bearer between the radio device and the CN for service level communication between the service client and the at least one server.

10 Claims, 7 Drawing Sheets

(51) Int. Cl.
*H04W 88/14* (2009.01)
*H04W 28/02* (2009.01)
*H04L 29/12* (2006.01)
*H04W 92/04* (2009.01)

(52) U.S. Cl.
CPC ........ *H04W 28/0263* (2013.01); *H04W 88/14* (2013.01); *H04W 92/04* (2013.01)

(56) References Cited

U.S. PATENT DOCUMENTS

| | | | | |
|---|---|---|---|---|
| 2013/0287012 | A1* | 10/2013 | Pragada | H04W 76/25 370/338 |
| 2013/0290493 | A1* | 10/2013 | Oyman | H04W 4/70 709/219 |
| 2014/0219230 | A1* | 8/2014 | Schierl | H04W 72/08 370/329 |
| 2014/0372624 | A1* | 12/2014 | Wang | H04L 65/60 709/231 |
| 2015/0249623 | A1* | 9/2015 | Phillips | H04L 65/4084 709/219 |
| 2015/0304122 | A1* | 10/2015 | Pazos | H04L 12/1845 370/312 |
| 2016/0112896 | A1* | 4/2016 | Karampatsis | H04W 28/0252 370/230.1 |
| 2016/0134760 | A1* | 5/2016 | Castro Castro | H04L 12/1407 455/406 |
| 2016/0212668 | A1* | 7/2016 | Castro Castro | H04L 47/20 |
| 2016/0248682 | A1* | 8/2016 | Lee | H04W 12/08 |
| 2016/0373821 | A1* | 12/2016 | Nair | H04N 21/23439 |
| 2016/0381698 | A1* | 12/2016 | Grinshpun | H04L 65/80 370/252 |
| 2017/0195242 | A1* | 7/2017 | Ibrahim | H04L 65/80 |
| 2018/0199244 | A1* | 7/2018 | Nylander | H04W 28/0263 |

* cited by examiner

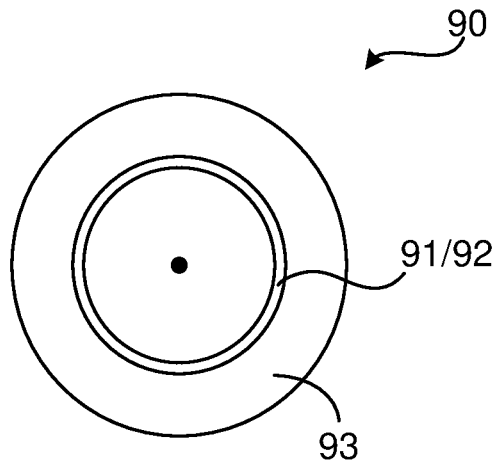
Fig. 9
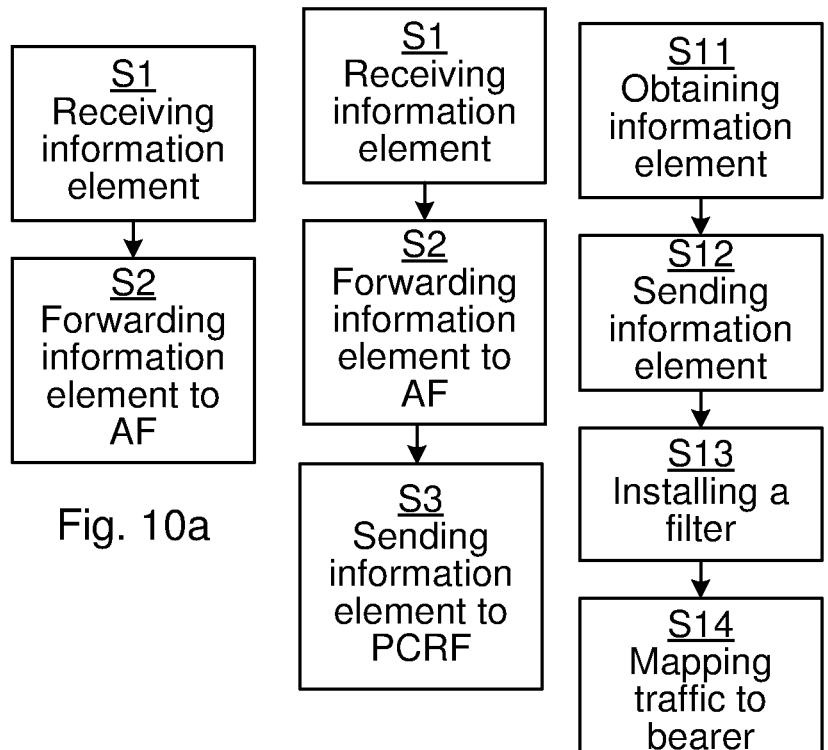
Fig. 10a
Fig. 10b
Fig. 11

SETTING UP A DEDICATED BEARER IN A RADIO COMMUNICATION NETWORK

This application is a national phase of Patent Cooperation Treaty (PCT) patent application No. PCT/SE2015/050744, filed Jun. 25, 2015, the disclosure of which is incorporated herein by reference in its entirety.

TECHNICAL FIELD

The present disclosure relates to a method performed in a cellular communication network for setting up a dedicated bearer between a radio device and a core network.

BACKGROUND

FIG. 1 is a simplified network illustration. The App x and App y in the User Equipment (UE) communicates with their respective server located on the Internet via the mobile operators Radio Access Network (RAN), Core Network (CN) and service network. To take the Adaptive Bit Rate feature as an example, for this feature the video server has the video encoded in different bitrates, and the UE selects the format based on throughput estimations. End user experience or Quality of Experience (QoE) is a differentiator for mobile operators and internet service providers. Applications are attempting to be adaptive to ensure a good QoE, e.g. by adapting to varying throughput by changing to an encoded format with a suitable bitrate. Currently this is done by trying to estimate the throughput between the server and the application in the UE, e.g. based on measured link bit rate or round trip times (RIT). How frequently the bitrate can be changed varies. A typical interval for adaptive video streaming would be every 2-5 seconds.

FIG. 2 is a schematic diagram of Evolved Packet Core (EPC) architecture (non-roaming) for access to a cellular network in accordance with a Third Generation Partnership Project (3GPP) standard. Evolved Packet System (EPS) is the Evolved 3GPP Packet Switched Domain and consists of EPC and an Evolved Universal Terrestrial Radio Access Network (E-UTRAN). The architecture is defined in 3GPP Technical Specification (TS) 23.401, which also defines the Packet Data Network (PDN) Gateway PGW, the Serving Gateway (SGW), the Policy and Charging Rules Function (PCRF), the Mobility Management Entity (MME) and the user equipment (UE, a radio device e.g. a mobile phone). The Long Term Evolution (LTE) radio access network, E-UTRAN, comprises one or more base stations called evolved Node B (eNB).

The overall E-UTRAN architecture is further defined in for example 3GPP TS 36.300. The E-UTRAN comprises eNBs providing the E-UTRAN user plane (radio interface user plane layers such as Packet Data Convergence Protocol (PDCP), Radio Link Control (RLC), Media Access Control (MAC) and physical layer (PHY)) and control plane (Radio Resource Control, RRC, in addition to the above user plane protocol layers) protocol terminations towards the UE. The eNBs are interconnected with each other over the X2 interface. The eNBs are also connected by means of the S1 interface to the EPC, more specifically to the MME over the S1-MME interface and to the SGW over the S1-U interface.

In 3GPP, Quality of Service (QoS) is managed on a per bearer level from the CN. The RAN is responsible for setting up the radio bearers, radio resource management, and enforcing QoS according to the bearer QoS Profile—over the radio (e.g. LTE-Uu) interface in the downlink (DL) and over the transport network in the uplink (UL). The architectures differ slightly over the different radio access networks (e.g. 3G/Wideband Code Division Multiple Access (WCDMA) and 4G/LTE) but the QoS principles are similar (at least for 3G and 4G networks). FIG. 3 shows the EPS bearer architecture and the different levels of bearers building up the end-to-end connection for the UE.

3GPP defines the concept of a PDN. A PDN is in most cases an IP network, e.g. Internet or an operator IP Multimedia Subsystem (IMS) service network. A PDN has one or more names. Each name is defined in a string called Access Point Name (APN). The PGW is a gateway towards one or more PDNs. A UE may have one or more PDN connections. A PDN connection is a logical IP tunnel between UE and PGW, providing the UE access to a PDN. The setup of a PDN connection is initiated from the UE.

Every PDN connection consists of one or more EPS bearers. See 3GPP TS 23.401 section 4.7.2 for a description of the bearer concept. A bearer uniquely identifies traffic flows that receive a common QoS treatment between a UE and a PGW. Each bearer on a particular access has a unique bearer ID. On the 3GPP access, the bearer is end-to-end between UE and PGW. Every PDN connection has at least one bearer and this bearer is called the default bearer. All additional bearers on the PDN connection are called dedicated bearers.

A bearer carries traffic in the form of IP packets. Which traffic is carried on a bearer is defined by filters. A filter is an n-tuple where each element in the tuple contains a value, a range, or a wildcard. An n-tuple is also known as an IP flow.

An example of a 5-tuple is (dst IP=83.50.20.110, src IP=145.45.68.201, dst port=80, src port=*, prot=TCP). This 5-tuple defines a source (src) and destination (dst) IP address, a source and destination port, and a protocol. The source port is a wildcard. Traffic matching this 5-tuple filter would be all Transmission Control Protocol (TCP) traffic from IP=145.45.68.201 to IP=83.50.20.110 and port=80.

An end-to-end connection is achieved by means of the EPS bearer and an external bearer between the PGW and a peer entity in the PDN (e.g. the Internet). The peer entity may e.g. be a server of a service provider.

A traffic flow template (TFT) contains one or more filters. Every bearer has a TFT. One bearer within a PDN connection and access may lack an explicit TFT (this bearer is typically the default bearer). Implicitly such a bearer has a TFT with a single filter matching all packets.

Bearers are used for example to provide different quality of service and characteristics. When a UE is active it has a default bearer where all traffic goes. The network or the UE can initiate a secondary/dedicated bearer with a different quality/characteristics. The network can detect a flow that should have a dedicated bearer by inspecting the traffic, or the network can be informed by an Application Function (AF) which provides a service layer between a service application and the PCRF. With reference to FIG. 2, an entity in the operators IP services, or the network can be informed by the UE about the need for a dedicated bearer, for example, if a video session is detected. The network then could trigger the establishment of a new bearer, apply a filter to separate which traffic should go on which bearer, i.e. the TFT. This TFT is also sent to the UE so that the UE can put UL traffic on the correct bearer. In DL, TFTs are used to map/select which transport tunnel (GTP tunnel) and bearer a certain flow should be sent on. A TFT can comprise for example the following identifiers:

Source Address and Subnet Mask
Protocol Number (IPv4)/Next Header (IPv6)
Destination Port Range Source Port Range
IPsec SPI
TOS (IPv4)/Traffic Class (IPv6) and Mask
Flow Label (IPv6)

For example, the PGW will, when receiving an IP packet from Internet with destination IP address, select a UE context based on the destination IP address. This means that the UE context is identified with an UE IP address and contains a number of TFTs associated for each dedicated bearer established for the UE. The PGW then checks if there is a TFT associated with information included in the received IP packet in the UE context and try to match the received IP packet with the TFT, and if there is a match send the packet on the dedicated bearer associated with that TFT. Similarly for the UE, when an UL packet is sent from the higher layer parts of the UE, e.g. an app, and received by the lower layer of the UE, e.g. where the radio protocols reside, there is a check if there is a TFT that matches and if there is match then the UL packet is sent on the dedicated bearer associated with that TFT.

In case QoS and/or TFT for a UE and EPS bearer(s) need to be updated, the UE can request Bearer Resource Modification and the network (NW) can initiate the Dedicated Bearer Activation procedure in accordance with 3GPP TS 23.401.

SUMMARY

The present disclosure is related to providing new functionality in existing (2G, 3G, 4G etc.) and future (5G, 6G, etc.) RAN and radio devices. The area of functionality comprises interactions between the service domain and RAN domain, or other domain within the communication network, for example between an app running on a radio device and a RAN node such as an eNB.

There are some problems related to the setting up of a dedicated bearer for a service, as illustrated by means of FIG. 4 using Dynamic Adaptive Streaming over HTTP (DASH) since DASH is a technology with which the present invention may be used. FIG. 4 shows an example of DASH usage for the case when the video segments are distributed in multiple different servers, e.g. servers of a Content Delivery Network (CDN), shown as CDN1 and CDN2 in the figure. An aspect of the figure is the step 3 in which the service client (in the radio device/UE) receives the manifest file from a web server of the service provider that describes in which servers the video segments are available (the manifest contains also additional information which will not be discussed herein). The manifest contains multiple BaseUrl-entries indicating in which servers the video segments are available.

A problem is how to establish a dedicated bearer for the whole video session, i.e. meaning in the example of FIG. 4 that DASH-traffic from the radio device towards both CDN1 and CDN2 servers, and vice versa, is mapped to the same dedicated bearer. There do exist solutions but these have some shortcomings as described in the following:

1 Core Network-Based Solutions

It would be possible for a node in the CN (e.g. in the SGi-interface) to inspect traffic sent towards all radio devices connected to it, and when a message containing a manifest is detected, the node in the CN could use the existing Rx-interface towards the PCRF to initiate establishment of a dedicated bearer for the video session.

A first shortcoming of this solution is that the CN would need to inspect all traffic towards all radio devices to be able to detect all different manifests and read the manifests to get the addresses to be filtered into the dedicated bearers. Note that the manifests contain uniform resource locators (URL), which need to be translated into IP addresses, i.e. very capacity demanding.

A second shortcoming is that this solution would only work for the case when traffic is sent in the clear on SGi-interface, i.e. without encryption. Usage of end-to-end encryption is increasing in the Internet making this solution impossible.

2 Radio Device-Based Solutions.

The service client in the radio device receives the manifest and it would in theory be possible for the radio device to trigger Bearer Resource Modification as described above. In this case the signalling could be used to indicate that a new dedicated bearer would be needed for traffic towards the destinations listed in the manifest.

A shortcoming with this solution is that the service client receiving the manifest is likely in the application layer and the Bearer Resource Modification is triggered from the 3GPP modem/chipset where all the Non-Access Stratum (NAS) and Access Stratum (AS) signalling towards the communication network is implemented. Therefore this solution would need an Application Programming Interface (API) from the chipset/modem to the application layer. Such an API does not currently exist and if implemented, the implementation would likely be in a device vendor specific way resulting in multiple different APIs.

Therefore it would be advantageous if a solution existed that overcomes the above problems, meaning that the solution works also in the case of end-to-end encryption and without the need to have any device internal APIs towards the 3GPP chipset/modem.

Service applications are attempting to be adaptive to ensure a good QoE, e.g. by adapting to varying throughputs by changing the bit rate or resolution of a streaming video and/or audio to avoid freezing of the play-out. Currently, this is done by trying to estimate the throughput between server and application in the radio device, e.g. based on measured link bit rate or round trip times (RIT). The estimation is typically performed by the application in the radio device, i.e. the service client (herein also called "client"). An interface between the mobile network and the client could be used to convey information that can be used to enhance service delivery and QoE.

It would be convenient to provide interaction between the service client in the radio device and the RAN based on user plane communication. However, since dedicated bearers are used to deliver the service in question, the interaction communication should preferably be possible to relate to the dedicated bearer of the service, since for example the achievable bitrate may depend on the priority of the bearer.

It may be possible to improve the throughput estimations by having network (NW) interaction with the clients, e.g. in accordance with the architecture illustrated in FIG. 5. A new functionality called an Interaction Function (IF), could also be called an Interaction Gateway, is introduced in the network side for the communication towards (different parts of) a connected radio device. An I1-interface is introduced between the radio device and the IF. In addition, the IF may have another interface, called an I2-interface, towards the RAN depending on the position of the IF (e.g. in the RAN as shown in FIG. 5 or co-located in an AF node. In respect of FIG. 5, it is assumed that the IF is in the RAN.

The I1-interface may be defined based on user plane traffic. It may for example be User Datagram Protocol (UDP)/Internet Protocol (IP)-based so that the client (app) in the radio device is able to send and receive interaction messages. The intention is that a single IP address may be used by the RAN nodes in one operators network for the interaction. This may simplify Operations and Maintenance (O&M) and RAN handling. The presence of this IP address (called RAN IP address, which may be part of default IF address information) may thus be an indication of an interaction session message for the RAN. The client in the radio device can for example obtain this IP address by a Domain Name System (DNS) lookup. Additional measures may be needed since RAN does not normally terminate user plane traffic. Therefore, the RAN may perform "sniffing" of the uplink (UL) traffic to detect if a message is an interaction message or not (i.e. if the destination IP address=RAN IP address). When an interaction message is identified, it may only be forwarded to the IF (i.e. not towards the core network). When the IF in RAN wants to send an interaction message to the radio device, it is injected in the downlink traffic by the RAN. For the use case of network assistance (which aims to improve QoE), the client in the radio device sends a query message to the RAN node asking for the available bitrate. This query is handled by the IF which interacts with a Function for Recommendation, wherein an achievable bit rate is estimated or predicted for the radio device. Then, a response message may be sent back to the radio device. The achievable bitrate may depend on a number of factors, e.g. number of radio devices in the cell that needs to share the capacity, the radio conditions of the radio device, and the priority for the bearer.

In accordance with the present disclosure, the user plane interaction between the service client in the radio device and the IF is used for allowing the radio device to initiate setting up of a dedicated bearer for a service level communication (e.g. video streaming) between the service client and at least one server of the service provider.

According to an aspect of the present disclosure, there is provided a method performed in a communication network comprising a cellular RAN, a CN and an AF. The method comprises receiving, via a user plane bearer, from a service client in a radio device connected to the RAN, at least one address information element of at least one server of a service provider. The method also comprises forwarding the at least one address information element to the AF for setting up of a dedicated bearer between the radio device and the CN for service level communication between the service client and the at least one server.

According to another aspect of the present disclosure, there is provided a network arrangement (e.g. a network node) for a communication network comprising a cellular RAN, a CN and an AF. The arrangement comprises processor circuitry, and a storage storing instructions executable by said processor circuitry whereby said arrangement is operative to receive, via a user plane bearer, from a service client in a radio device connected to the RAN, at least one address information element of at least one server of a service provider. The network arrangement is also operative to forward the at least one address information element to the AF for setting up of a dedicated bearer between the radio device and the CN for service level communication between the service client and the at least one server.

According to another aspect of the present disclosure, there is provided a method performed in a radio device connected to a cellular RAN comprised in a communication network also comprising a CN. The method comprises obtaining at least one address information element of at least one server of a service provider. The method also comprises sending the at least one address information element to an interaction function in the communication network over a user plane bearer for initiating setting up of a dedicated bearer between the radio device and the CN for service level communication between a service client in the radio device and the at least one server. The method also comprises installing a filter for the dedicated bearer in accordance with the at least one address information element. The method also comprises mapping data traffic of the service level communication onto the dedicated bearer by means of the filter.

According to another aspect of the present disclosure, there is provided a radio device configured for being connected to a cellular RAN comprised in a communication network also comprising a CN. The radio device comprises processor circuitry, and a storage storing instructions executable by said processor circuitry whereby said radio device is operative to obtain at least one address information element of at least one server of a service provider. The radio device is also operative to send the at least one address information element to an interaction function in the communication network over a user plane bearer for initiating setting up of a dedicated bearer between the radio device and the CN for service level communication between a service client in the radio device and the at least one server. The radio device is also operative to install a filter for the dedicated bearer in accordance with the at least one address information element. The radio device is also operative to map data traffic of the service level communication onto the dedicated bearer by means of the filter.

According to another aspect of the present disclosure, there is provided a computer program product comprising computer-executable components for causing a network arrangement to perform an embodiment of a method of the present disclosure when the computer-executable components are run on processor circuitry comprised in the network arrangement.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program comprising computer program code which is able to, when run on processor circuitry of a network arrangement in a communication network comprising a cellular RAN, a CN and an AF, cause the network arrangement to receive, via a user plane bearer, from a service client in a radio device connected to the RAN, at least one address information element of at least one server of a service provider. The code is also able to cause the network arrangement to forward the at least one address information element to the AF for setting up of a dedicated bearer between the radio device and the CN for service level communication between the service client and the at least one server.

According to another aspect of the present disclosure, there is provided a computer program comprising computer program code which is able to, when run on processor circuitry of a radio device connected to a cellular RAN comprised in a communication network also comprising a CN, cause the radio device to obtain at least one address information element of at least one server of a service provider. The code is also able to cause the radio device to send the at least one address information element to an interaction function in the communication network over a user plane bearer for initiating setting up of a dedicated bearer between the radio device and the CN for service level communication between a service client in the radio device and the at least one server. The code is also able to cause the radio device to install a filter for the dedicated bearer in accordance with the at least one address information element. The code is also able to cause the radio device to map data traffic of the service level communication onto the dedicated bearer by means of the filter.

According to another aspect of the present disclosure, there is provided a computer program product comprising an embodiment of a computer program according to the present disclosure and a computer readable means on which the computer program is stored.

The present disclosure provides embodiments for establishing dedicated bearers also for the case when end-to-end encryption is used in the network and without the need to have any radio device internal APIs e.g. from the application layer towards the 3GPP chipset/modem. The setting up of a dedicated bearer comprises setting up the bearer by installing a filter, e.g. a TFT, typically in the PGW as discussed above, and/or in the radio device for the bearer. The solution is based on the I1 interface between the service client in the radio device and the IF, e.g. in the RAN or with the AF (and possibly an additional interface between the RAN and the AF, if the application function is in the RAN). The radio device sends an information element identifying the service level communication for the dedicated bearer using the I1-interface to the interaction function. The IF further communicates the information element towards an AF node over the SGi-interface. Then, the AF node may use the received information element to trigger establishment of a dedicated bearer using the Rx-interface towards the PCRF.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following to detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 9 is a schematic illustration of an embodiment of a computer program product in accordance with the present disclosure.

FIG. 10a is a schematic flow chart of an embodiment of a method performed in the network arrangement in accordance with the present disclosure.

FIG. 10b is a schematic flow chart of another embodiment of a method performed in the network arrangement in accordance with the present disclosure.

FIG. 11 is a schematic flow chart of an embodiment of a method performed in the radio device in accordance with the present disclosure.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The present disclosure provides the possibility to establish dedicated bearers also for the case when end-to-end encryption is used in the communication network and without the need to have any radio device internal APIs e.g. from the application layer towards the 3GPP chipset/modem. The solution may use the I1 interface used for service client—network interaction to enable setting up of dedicated bearers. In an embodiment, the radio device sends an information element identifying the service level communication for the dedicated bearer using the I1-interface to the IF in the RAN. The IF/RAN further communicates the information element via an I3-interface (between the IF/RAN and the AF), towards an AF node in the SGi-interface. Then, the AF node uses the received information element to trigger establishment of dedicated bearers using the Rx-interface towards the PCRF.

Embodiments are exemplified using DASH but the principles described may apply to any content and especially for the case when end-to-end encryption is being applied.

Figure 1:
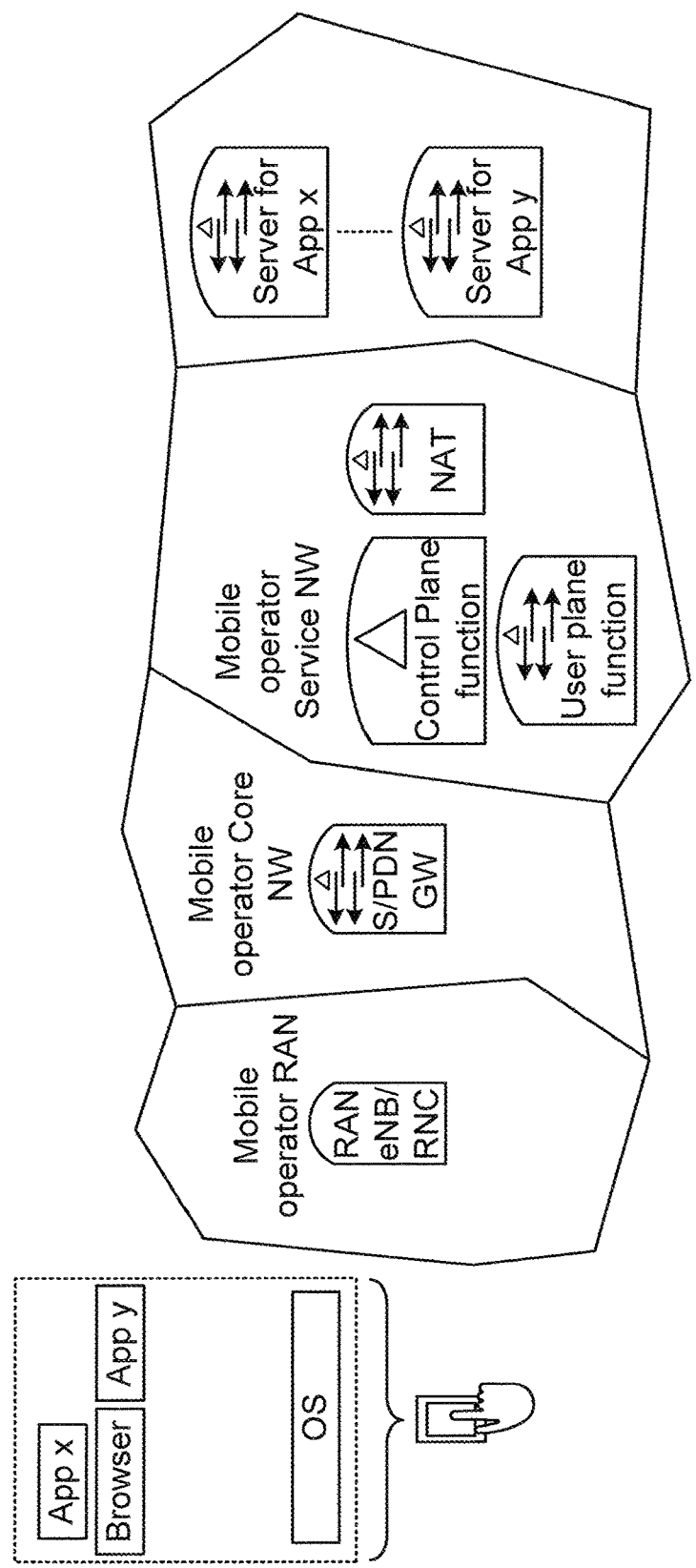
FIG. 1 is a schematic overview of a standard 3GPP communication network.
Figure 2:
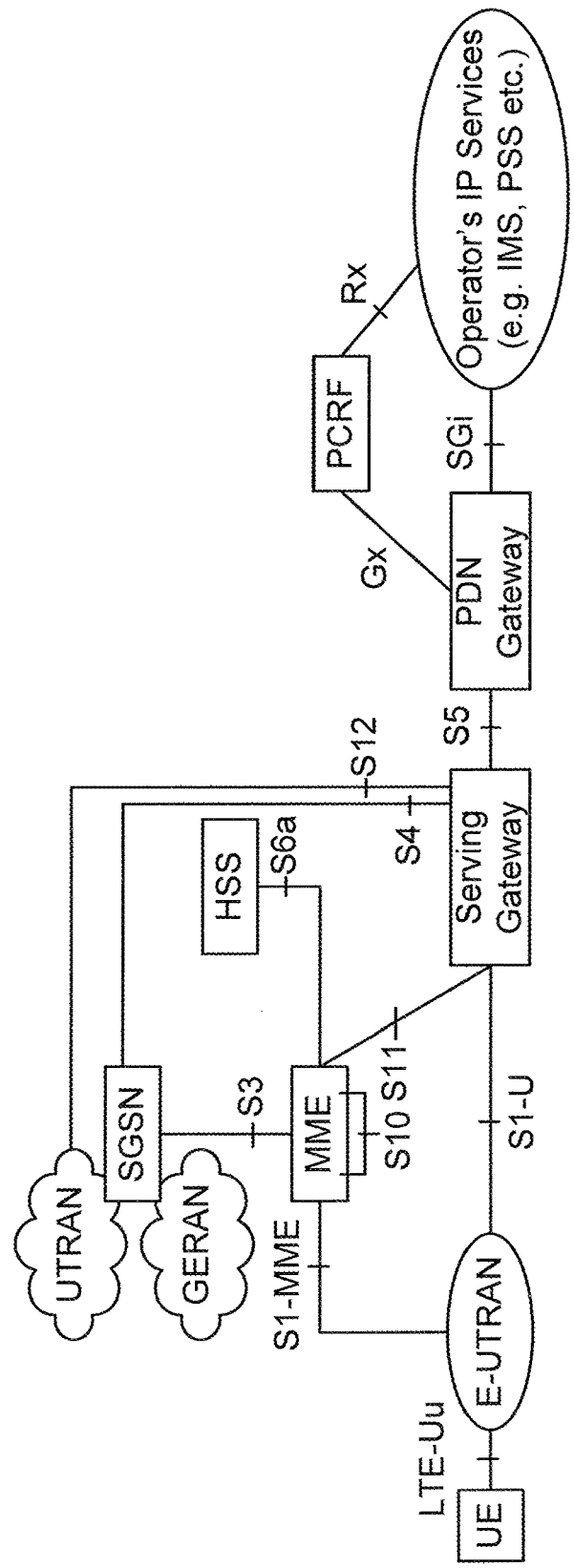
FIG. 2 is another, more detailed, schematic block diagram overview of a standard 3GPP communication network.
Figure 3:
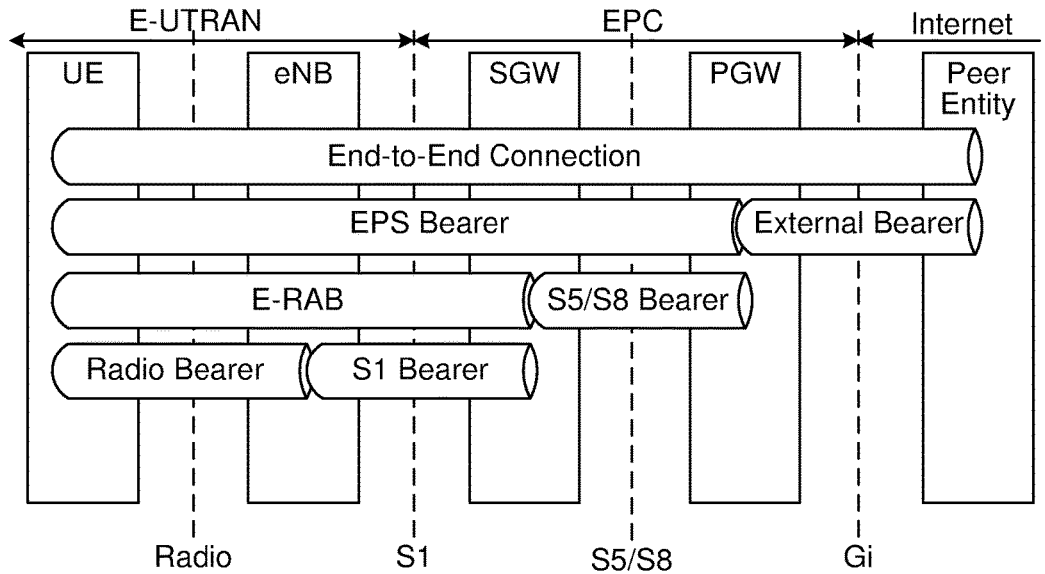
FIG. 3 is a schematic diagram illustrating the different bearer types in accordance with EPC.
Figure 4:
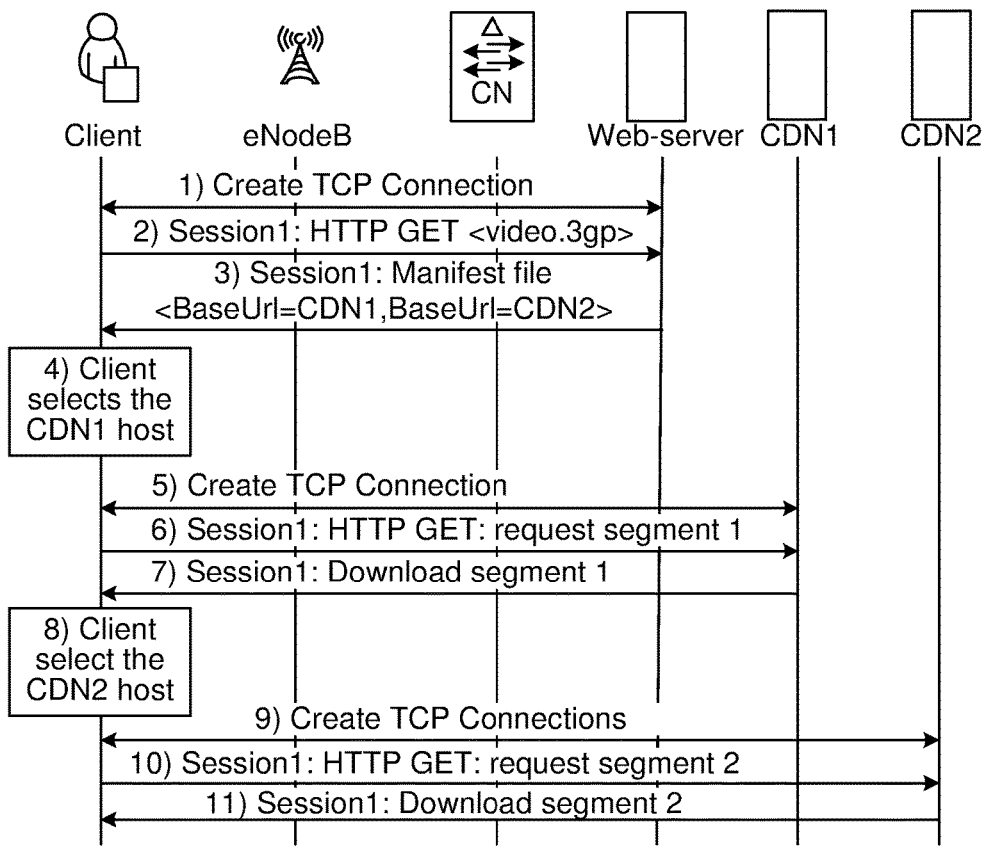
FIG. 4 is a schematic signalling diagram illustrating how a service client in accordance with the present disclosure may obtain a service from a plurality of servers of a service provider.
Figure 5:
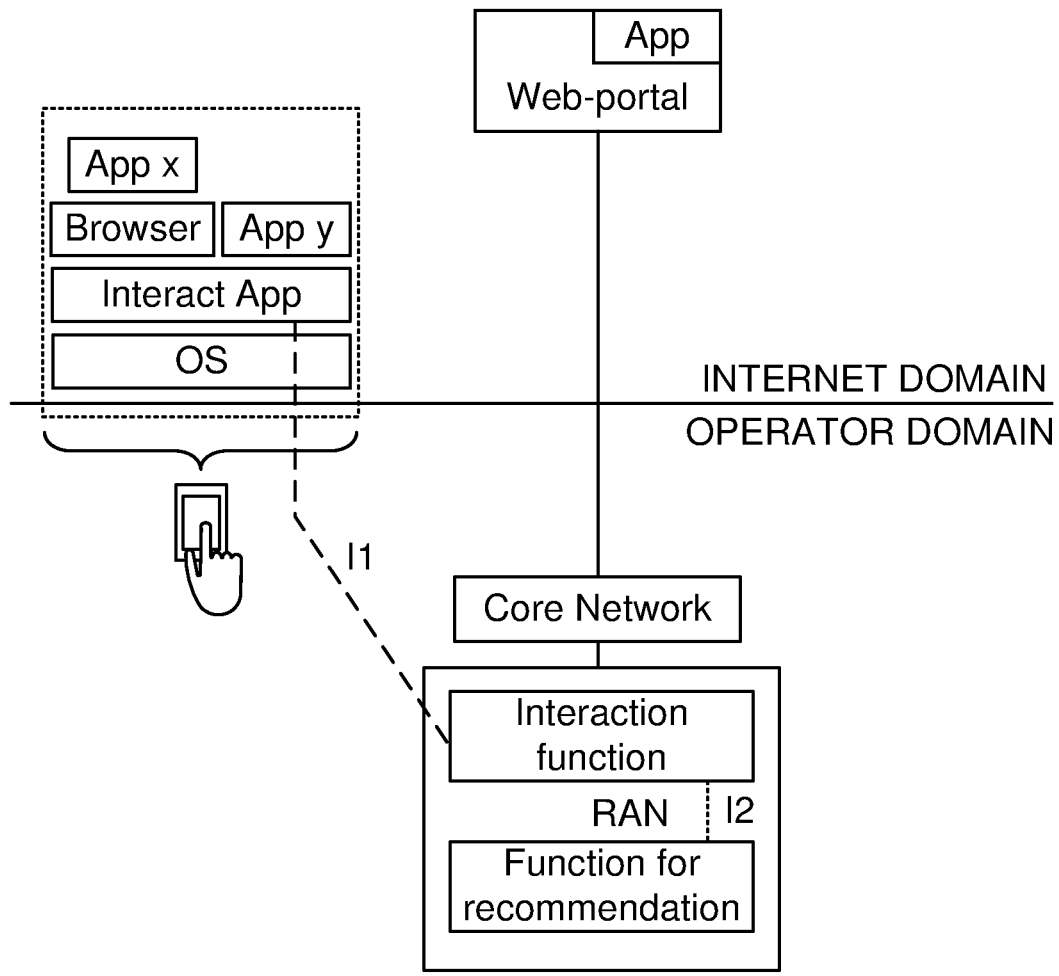
FIG. 5 is a schematic block diagram illustrating a positioning of an IF as well as interfaces I1 and I2 to said IF, in accordance with the present disclosure.
Figure 6:
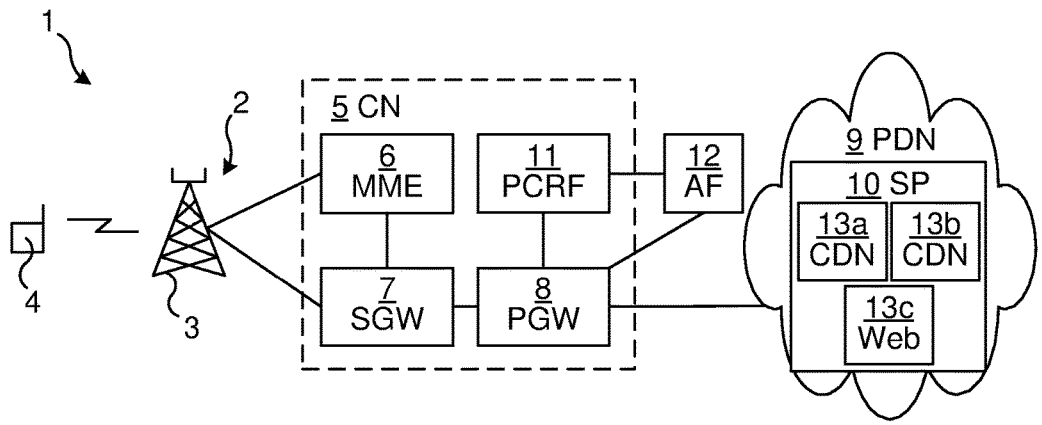
FIG. 6 is a schematic block diagram of an embodiment of a communication network in accordance with the present disclosure.

FIG. 6 is a schematic block diagram of a radio device 4 connected to a communication network 1. The communication network 1 comprises a RAN 2, e.g. a cellular RAN in accordance with a 3GPP standard, comprising one or a plurality of RAN nodes 3, e.g. evolved Node B (eNB) or Node B in combination with Radio Network Controller (RNC). The term "network arrangement" as used herein may refer to any part (e.g. node) of the communication network comprising the IF, e.g. a RAN node 3 why the reference numeral "3" is used herein as an example of a network arrangement. The communication network 1 also comprises a CN 5 comprising an SGW 7 and a PGW 8 as well as an MME 6 and a PCRF 11, and any other standard CN nodes needed. Via the PGW, the communication network is connected to the PDN 9, e.g. the Internet, in which a service provider (SP) to resides with one or a plurality of servers 13 e.g. Content Delivery Network (CDN) servers 13a and 13b as well as a web server 13c. An entity acting as an AF 12 is also comprised in the communication network 1. The AF sees user plane traffic from the PGW, and is able to have control plane interaction with the PCRF.

The radio device 4 may be any device or user equipment (UE), mobile or stationary, enabled to communicate over a radio channel in a communication network 1, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 7A:
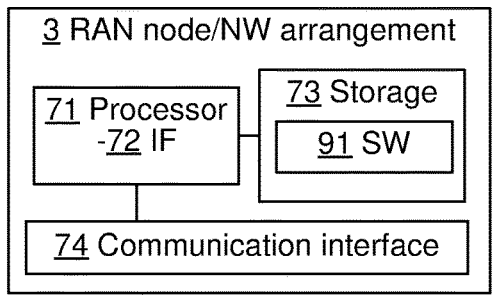
FIG. 7a is a schematic block diagram of an embodiment of a network arrangement in accordance with the present disclosure.

FIG. 7a schematically illustrates an embodiment of a network arrangement 3 (here in the form of a RAN node) of the present disclosure. The RAN node 3 comprises processor circuitry 71 e.g. a central processing unit (CPU). The processor circuitry 71 may comprise one or a plurality of processing units in the form of microprocessor(s). However, other suitable devices with computing capabilities could be comprised in the processor circuitry 71, e.g. an application specific integrated circuit (ASIC), a field programmable gate array (FPGA) or a complex programmable logic device (CPLD). The processor circuitry 71 is configured to run one or several computer program(s) or software (SW) 91 (see also FIG. 9) stored in a storage 73 of one or several storage unit(s) e.g. a memory. Thus, the interaction function (IF) 72, e.g. as discussed above, may be formed in the processor circuitry 71 by SW 91 stored in the storage 73 running on the processor circuitry 71. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 71 may also be configured to store data in the storage 73, as needed. The RAN node 3 also comprises a communication interface 74 for communication with other nodes in the communication network 1 as well as with the radio device over a radio interface. The communication interface comprises a transmitter and a receiver, which may be combined into a transceiver, as well as an antenna for radio communication.

According to an aspect of the present disclosure, there is provided a network arrangement 3 for a communication network 1 comprising a cellular RAN 2, a CN 5 and an AF 12. The network arrangement comprises processor circuitry 71, and a storage 73 storing instructions 91 executable by said processor circuitry whereby said arrangement is operative to receive, via a user plane bearer, from a service client in a radio device 4 connected to the RAN, at least one address information element of at least one server 13 of a service provider 10. The network arrangement is also operative to forward the at least one address information element to the AF 12 for setting up of a dedicated bearer between the radio device 4 and the CN for service level communication between the service client and the at least one server 13.

Figure 7B:
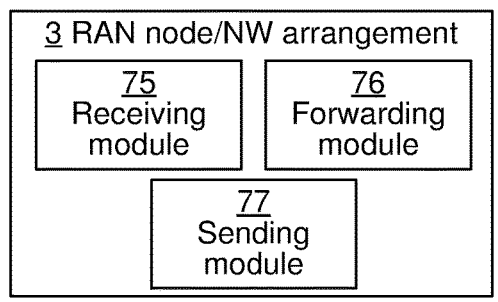
FIG. 7b is a schematic block diagram of another embodiment of a network arrangement in accordance with the present disclosure.

FIG. 7b is a schematic block diagram functionally illustrating an embodiment of the network arrangement/node 3 in FIG. 7a. As previously mentioned, the processor circuitry 71 may run software 91 for enabling the network arrangement 3 to perform an embodiment of a method of the present disclosure, whereby functional modules may be formed in the network arrangement 3 e.g. in the processor circuitry 71 for performing the different steps of the method. These modules are schematically illustrated as blocks within the network arrangement 3.

According to an aspect of the present disclosure, there is provided a network arrangement 3 (e.g. in the form of a RAN node or other part of the RAN 2, or other node comprising the AF 12). The network arrangement 3 is for a communication network 1 comprising a cellular RAN 2, a CN 5 and an AF 12. The network arrangement comprises means (e.g. the receiving module 75 such as a receiver of the communication interface 74) for receiving, via a user plane bearer, from a service client in a radio device 4 connected to the RAN, at least one address information element of at least one server 13 of a service provider 10. The network arrangement also comprises means (e.g. the forwarding module 76) for forwarding the at least one address information element to the AF 12 for setting up of a dedicated bearer between the radio device 4 and the CN for service level communication between the service client 82 and the at least one server 13. In some embodiments, the network arrangement also comprises means (e.g. the sending module 77 such as a transmitter of the communication interface 74) for sending the at least one address information element to a PCRF 11 in the CN 5 over an Rx interface.

Figure 8A:
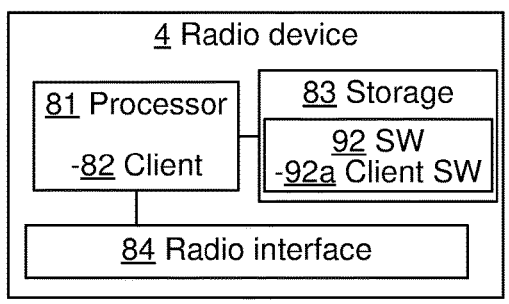
FIG. 8a is a schematic block diagram of an embodiment of a radio device in accordance with the present disclosure.

FIG. 8a schematically illustrates an embodiment of a radio device 4 of the present disclosure. The radio device 4 comprises processor circuitry 81 e.g. a central processing unit (CPU). The processor circuitry 81 may comprise one or a plurality of processing units in the form of microprocessor(s). However, other suitable devices with computing capabilities could be comprised in the processor circuitry 81, e.g. an application specific integrated circuit (ASIC), a field programmable gate array (FPGA) or a complex programmable logic device (CPLD). The processor circuitry 81 is configured to run one or several computer program(s) or software (SW) 92 (see also FIG. 9) stored in a storage 83 of one or several storage unit(s) e.g. a memory. Thus, the service client 82 (e.g. a service application, an app) may be formed in the processor circuitry 81 by client SW 92a stored in the storage 83 running on the processor circuitry 81. The storage unit is regarded as a computer readable means 93 (see FIG. 9) as discussed herein and may e.g. be in the form of a Random Access Memory (RAM), a Flash memory or other solid state memory, or a hard disk, or be a combination thereof. The processor circuitry 81 may also be configured to store data in the storage 83, as needed. The radio device 4 also comprises a radio interface 84 for communication with/via the communication network 1 e.g. via the RAN 2. The radio interface comprises a transmitter and a receiver, which may be combined into a transceiver, as well as an antenna for radio communication.

According to an aspect of the present disclosure, there is provided a radio device 4 configured for being connected to a cellular RAN 2 comprised in a communication network 1 also comprising a CN 5. The radio device comprises processor circuitry 81, and a storage 83 storing instructions 92 executable by said processor circuitry whereby said radio device is operative to obtain at least one address information element of at least one server 13 of a service provider 10. The radio device is also operative to send the at least one address information element to an interaction function 72 in the communication network 1 over a user plane bearer for initiating setting up of a dedicated bearer between the radio device 4 and the CN for service level communication between a service client 82 in the radio device and the at least one server 13. The radio device is also operative to install a filter for the dedicated bearer in accordance with the at least one address information element. The radio device is also operative to map data traffic of the service level communication onto the dedicated bearer by means of the filter.

Figure 8B:
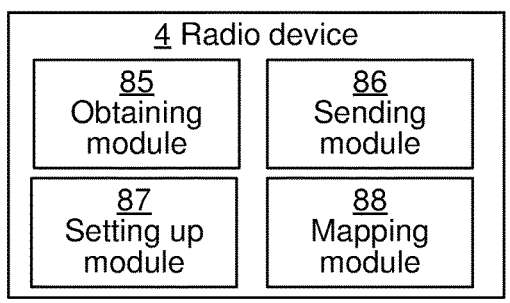
FIG. 8b is a schematic block diagram of another embodiment of a radio device in accordance with the present disclosure.

FIG. 8b is a schematic block diagram functionally illustrating an embodiment of the radio device 4 in FIG. 8a. As previously mentioned, the processor circuitry 81 may run software 92 for enabling the radio device 4 to perform an embodiment of a method of the present disclosure, whereby functional modules may be formed in the radio device 4 e.g. in the processor circuitry 81 for performing the different steps of the method. These modules are schematically illustrated as blocks within the radio device 4.

According to an aspect of the present disclosure, there is provided a radio device 4 configured for being connected to a cellular RAN 2 comprised in a communication network 1 also comprising a CN 5. The radio device comprises means (e.g. the obtaining module 85 such as a receiver of the radio interface 84) for obtaining at least one address information element of at least one server 13 of a service provider 10. The radio device also comprises means (e.g. the sending module 86 such as a transmitter of the radio interface 84) for sending the at least one address information element to an interaction function 72 in the communication network over a user plane bearer for initiating setting up of a dedicated bearer between the radio device 4 and the CN 5 for service level communication between a service client 82 in the radio device and the at least one server 13. The radio device also comprises means (e.g. the setting up module 87) for installing a filter for the dedicated bearer in accordance with the at least one address information element. The radio device also comprises means (e.g. the mapping module 88) for mapping data traffic of the service level communication onto the dedicated bearer by means of the filter.

FIG. 9 illustrates a computer program product 90. The computer program product 90 comprises a computer readable (e.g. non-volatile and/or non-transitory) medium 93 comprising a computer program 91 and/or 92 in the form of computer-executable components 91/92. The computer program/computer-executable components 91/92 may be configured to cause a network arrangement 3 or a radio device 4, e.g. as discussed herein, to perform an embodiment of a method of the present disclosure. The computer program/computer-executable components may be run on the processor circuitry 71/81 of the network arrangement 3/radio device 4 for causing it to perform the method. The computer program product 90 may e.g. be comprised in a storage unit or memory 73/83 comprised in the network arrangement 3/radio device 4 and associated with the processor circuitry 71/81. Alternatively, the computer program product 90 may be, or be part of, a separate, e.g. mobile, storage means/ medium, such as a computer readable disc, e.g. CD or DVD or hard disc/drive, or a solid state storage medium, e.g. a RAM or Flash memory. Further examples of the storage medium 93 can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

According to an aspect of the present disclosure, there is provided a computer program product 90 comprising computer-executable components 91 for causing a network arrangement 3 or a radio device 4 to perform an embodiment of a method of the present disclosure when the computer-executable components are run on processor circuitry 71/81 comprised in the network arrangement/radio device.

According to another aspect of the present disclosure, there is provided a computer program 91 comprising computer program code which is able to, when run on processor circuitry 71 of a network arrangement 3 in a communication network 1 comprising a cellular RAN 2, a CN 5 and an AF 12, cause the network arrangement to receive, via a user plane bearer, from a service client 82 in a radio device 4 connected to the RAN, at least one address information element of at least one server 13 of a service provider 10. The code is also able to cause the network arrangement to forward the at least one address information element to the AF for setting up of a dedicated bearer between the radio device and the CN for service level communication between the service client and the at least one server.

According to another aspect of the present disclosure, there is provided a computer program 92 comprising computer program code which is able to, when run on processor circuitry 81 of a radio device 4 connected to a cellular RAN 2 comprised in a communication network 1 also comprising a CN 5, cause the radio device to obtain at least one address information element of at least one server 13 of a service provider 10. The code is also able to cause the radio device to send the at least one address information element to an interaction function 72 in the communication network over a user plane bearer for initiating setting up of a dedicated bearer between the radio device and the CN for service level communication between a service client 82 in the radio device and the at least one server. The code is also able to cause the radio device to install a filter for the dedicated bearer in accordance with the at least one address information element. The code is also able to cause the radio device to map data traffic of the service level communication onto the dedicated bearer by means of the filter.

According to another aspect of the present disclosure, there is provided a computer program product 90 comprising an embodiment of a computer program 91 or 92 according to the present disclosure and a computer readable means 93 on which the computer program is stored.

FIG. 10a is a schematic flow chart of an embodiment of a method performed in the network arrangement 3 in accordance with the present disclosure.

Via a user plane bearer, from a service client 82 in a radio device 4 connected to the RAN, at least one address information element of at least one server 13 of a service provider to is received S1. The address information element(s) discussed herein may be any information that could be included in the TFT/filter for the dedicated bearer or information that can be used to derive other information to be included in the TFT/filter for the dedicated bearer. So in some embodiments the element is only IPv4/IPv6 address(es) or URL, in other embodiments address(es) and port number(s), in yet other embodiments also comprising the protocol (e.g. TCP or UDP) the ports apply for. Additional alternatives for the address information element(s) may be DiffServ/ToS bits in the IP-header.

Then, the at least one address information element is forwarded S2 to the AF 12 for setting up of a dedicated bearer between the radio device 4 and the CN for service level communication between the service client 82 and the at least one server 13. Thus, the service client 82 may trigger the setting up of a dedicated bearer (e.g. EPS bearer) for its service level communications (could alternatively be called e.g. signalling or transmissions) by user plane signalling (since the service client may be unable to perform control plane signalling with the network 1) with the communication network, typically the network arrangement discussed herein which comprises the IF 72.

FIG. 10*b* is a schematic flow chart of another embodiment of a method performed in the network arrangement 3 in accordance with the present disclosure. The receiving S1 and forwarding S2 are as discussed in respect of FIG. 10*a*. In addition, e.g. if the AF 12 is comprised in (or otherwise integrated or co-located with) the network arrangement 3, the at least one address information element is sent S3 to a PCRF 11 in the CN 5 e.g. over an Rx interface. Thereby, the PCRF may instruct the PGW to set up the dedicated bearer for the service level communication.

In some embodiments, the method is performed by an interaction function 72 comprised in the RAN 2, e.g. in a RAN node 3 such as an eNB, or co-located with the AF 12 (e.g. the AF 12 is comprised in (or otherwise integrated or co-located with) the network arrangement 2, or the network arrangement 3 is comprised in an AF node).

In some embodiments, the receiving S1 at least one address information element comprises receiving address information elements of at least two servers 13*a* and 13*b* of the service provider 10. The forwarding S2 may then be for initiating setting up of the dedicated bearer for the service level communication associated with any of the at least two servers, e.g. communication to/from both servers may be mapped to the dedicated bearer.

FIG. 11 is a schematic flow chart of an embodiment of a method performed in the radio device 4 in accordance with the present disclosure.

At least one address information element of at least one server (13) of a service provider to is obtained S11. The address information element may be obtained e.g. by receiving it from the service provider to e.g. from a web server 13*c*. The address information may in some way identify the server(s) 13*a* and/or 13*b* to/from which data traffic of the service level communication will be received/sent.

The at least one address information element is sent S12 to an interaction function 72 in the communication network 1 over a user plane bearer for initiating setting up of a dedicated bearer between the radio device 4 and the CN for service level communication between a service client 82 in the radio device and the at least one server 13. By means of the address information element (identifying the at least one server), the communication network 1 may set up the dedicated bearer on the network side.

Before, after or in parallel with the sending S12, the radio device 4 installs S13 the filter for the dedicated bearer in accordance with the at least one address information element. The radio device may e.g. be instructed by the communication network to perform the installing S13.

Then, the radio device can map S14 data traffic of the service level communication onto the dedicated bearer by means of the filter.

In some embodiments, the interaction function 72 is (as previously discussed) comprised in the RAN 2, e.g. in a RAN node 3 such as an eNB, or is co-located with an AF 12 comprised in the communication network 1.

In some embodiments, the sending S12 the at least one address information element comprises sending address information elements of at least two servers 13*a* and 13*b* of the service provider to, and the setting up S13 may comprise setting up the dedicated bearer for the service level communication associated with any of the at least two servers.

Example

With reference to the numbered steps in the signalling diagram of FIG. 12, example embodiments of the present disclosure will now be discussed.

Step 1) In the initial situation the radio device 4 (here a UE) is attached in accordance with LTE and is in RRC-CONNECTED state. It has a control plane connection (step 1*a*) to the eNB 3, MME 6, SGW 7, PGW 8 and PCRF 11. It also has a single user plane bearer, the default bearer (shown as step 1*b*).

Step 2) The service client 82 in the UE 4 initiates a media session and as a first step the TCP connection to the web server 13*c* is established. This is all mapped on the default bearer for the UE.

Step 3) The service client initiates HTTP GET towards the web server, and again this is mapped on the default bearer.

Step 4) The web server returns the manifest to the UE (on the default bearer). The manifest contains multiple BaseUrl-entries as {CDN1, CDN2}.

Step 5) The service client 82 in the UE 4 establishes an I1 communication session towards the RAN 2 (e.g. the IF 72) for the video session (i.e. the service level communication). This step may consist of multiple messages sent between the service client and the eNB 3 (on the default bearer). Alternatively, this step may have been performed earlier or be optional.

Step 6) The service client in the UE sends an I1 Traffic Indication message to the eNB (on the default bearer). The message contains Traffic Information information element (IE), i.e. comprising the address information element discussed herein, identifying the different traffic flows for the video session. In one example, the Traffic Information IE contains the IP-addresses of the CDN1 and CDN2 servers 13*a* and 13*b*. Further examples and embodiments for the Traffic Information IE are given below.

Step 7) The eNB 3 takes the information received in the I1 Traffic Indication message and forwards it to the AF 12 over an interface between the RAN and the AF (may be called I3).

Step 8) The AF sends a request for resources for an AF-session in the Authorize/Authenticate (AA) Request (AAR) message to the PCRF 11. The message contains an UE-identity (such as the IP-address of the UE 4) and an AF-Application-Identifier. In addition the message contains information identifying the different possible traffic flows for the video session (such as IP-addresses of CDN1 and CDN2 servers). The AF-Application-Identifier can be configured in the AF or received either from the UE or from the eNB.

Step 9) The PCRF validates the service information and authorizes the service using the AF-Application-Identifier. It then acknowledges the request for resources for an AF-session by replying with the AA Answer (AAA) message to the AF.

Step 10) The PCRF generates preconfigured Policy and Charging Control (PCC) rules with preconfigured information. The IP-addresses of the CDN1 and CDN2 servers may be indicated as target IP-addresses.

Step 11) The PCRF pushes the new PCC rule to the PGW using the Re-Auth (RA) Request (RAR) message. The PCC rule defines for example QoS Class of Identifier (QCI) and Allocation and Retention Priority (ARP) for the video session and the packet filters associated with the CDN1 and CDN2 servers.

Step 12) The PGW confirms the reception of the new PCC rule by the RA Answer (RAA) message.

Step 13) Based on the new PCC rule, the PGW decides to establish a Dedicated Bearer with the QCI and ARP as received from the PCRF (since no dedicated bearer existed with a QoS related to the QCI and ARP). The packet filters received from the PCRF are used for uplink and downlink TFTs.

Figure 12:
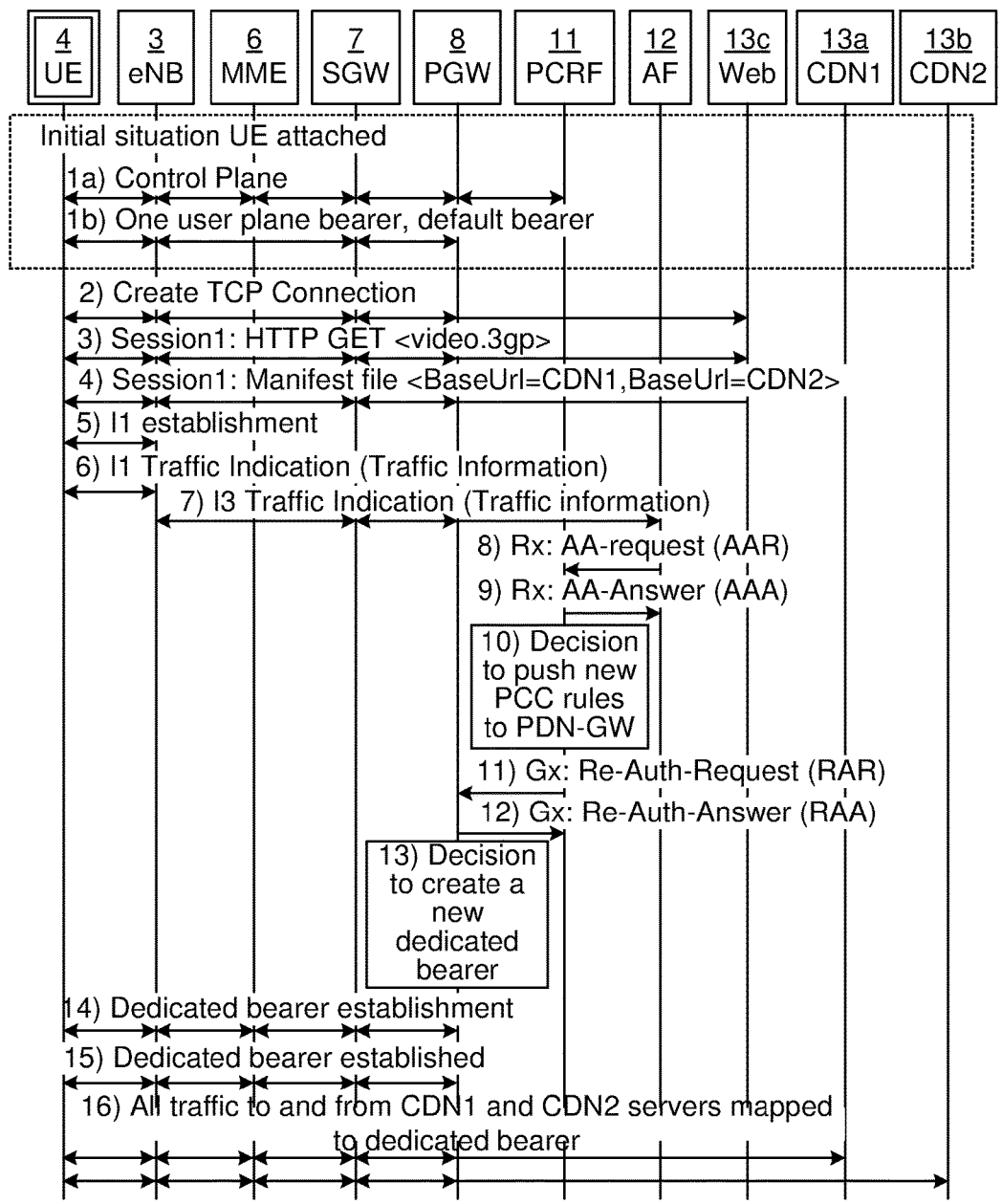
FIG. 12 is a schematic signalling diagram illustrating embodiments of the present disclosure.

In the case when the UE already has a dedicated bearer for the QCI, then the PGW decides to perform bearer modification to update the uplink and downlink TFTs with the packet filters (not shown in FIG. 12).

Step 14) The dedicated bearer is set up for the UE. Both the uplink TFT in the UE and the downlink TFT in the PGW are updated to include the IP addresses of the CDN1 and CDN2 servers (either as destination or source IP addresses depending on the direction i.e. UL or DL).

In the case when the UE already has a dedicated bearer for the QCI, in this step, bearer modification is triggered instead to update the uplink and downlink TFTs with the packet filters (not shown in FIG. 12).

Step 15) The newly established dedicated bearer (or the modified dedicated bearer) is shown.

Step 16) All traffic of the UE to and from CDN1 and CDN2 servers is mapped to the new or modified dedicated bearer.

As mentioned above, there are different possibilities when it comes to the handling of the Traffic Information IE, e.g. as following:

a) FIG. 12 implies that the UE performs DNS-queries to retrieve the IP-addresses for the servers CDN1 and CDN2 (if the server addresses were given as URL's in the manifest). This should take place between steps 4 and 6. In this case the I1 Traffic Indication message contains these IP-addresses of the CDN1 and CDN2 servers.

b) In another embodiment, the BaseUrl information received in the manifest is sent in the I1 Traffic Indication message. In this case there are multiple different possibilities for how the BaseUrl information is converted to IP-addresses (if needed). For example, either the AF 12 or the eNB 3 can perform the DNS-queries. In this case, step 8 in FIG. 12 would include the IP-addresses of the CDN1 and CDN2 servers. In another variant, the manifest (or the BaseUrl part of the manifest) is forwarded all the way to the PGW (via AF and PCRF) and the PGW performs the needed conversion to the IP-addresses. In still another variant the TFTs will contain the fully qualified domain names (FQDN) or host names instead of the IP-addresses.

c) The example in FIG. 12 only shows that the Traffic Information IE contains the IP-addresses of the CDN1 and CDN2 servers. Additional information can also be included for a better definition of the traffic flows towards these servers. Such information may consist of any information that can be included in the packet filters and TFTs, for example protocol used (e.g. TCP), and port number used (e.g. 80).

FIG. 12 describes the case when the service client 84 in the UE 4 communicates with the eNB 3 via the I1-interface and then I3-interface is used between the eNB and the AF 12. In another embodiment the service client in the UE communicates directly with the AF (if the IF 72 is i co-located (e.g. integrated) with the AF).

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a communication network comprising a cellular Radio Access Network, RAN, a Core Network, CN, and an Application Function, AF, the method comprising:
    receiving, via a user plane bearer, from a service client in a radio device connected to the RAN, at least two address information elements of at least two servers of a service provider; and
    forwarding the at least two address information elements to the AF for initiating setting up of a dedicated bearer between the radio device and the CN for service level communication between the service client and the at least two servers.

2. The method of claim 1, wherein the method is performed by an interaction function comprised in the RAN or co-located with the AF.

3. The method of claim 2, wherein the interaction function is co-located with the AF, the method further comprising:
    sending the at least two address information elements to a Policy and Charging Rules Function, PCRF, in the CN over an Rx interface.

4. A network arrangement for a communication network comprising a cellular Radio Access Network, RAN, a Core Network, CN, and an Application Function, AF, the network arrangement comprising:
    processor circuitry; and
    a storage storing instructions executable by said processor circuitry whereby said arrangement is operative to:
    receive, via a user plane bearer, from a service client in a radio device connected to the RAN, at least two address information elements of at least two servers of a service provider; and
    forward the at least two address information elements to the AF for initiating setting up of a dedicated bearer between the radio device and the CN for service level communication between the service client and the at least two servers.

5. The network arrangement of claim 4, wherein the network arrangement comprises an interaction function comprised in the RAN or co-located with the AF.

6. A method performed in a radio device connected to a cellular Radio Access Network, RAN, comprised in a communication network also comprising a Core Network, CN, the method comprising:
    obtaining at least two address information elements of at least two servers of a service provider;
    sending the at least two address information elements to an interaction function in the communication network over a user plane bearer for initiating setting up of a dedicated bearer between the radio device and the CN for service level communication between a service client in the radio device and the at least two servers;
installing a filter for the dedicated bearer in accordance with the at least two address information elements; and
mapping data traffic of the service level communication onto the dedicated bearer by means of the filter.

7. The method of claim 6, wherein the interaction function is comprised in the RAN or is co-located with an Application Function, AF, comprised in the communication network.

8. A radio device configured for being connected to a cellular Radio Access Network, RAN, comprised in a communication network also comprising a Core Network, CN, the radio device comprising:
 processor circuitry; and
 a storage storing instructions executable by said processor circuitry whereby said radio device is operative to:
 obtain at least two address information elements of at least two servers of a service provider;
 send the at least two address information elements to an interaction function in the communication network over a user plane bearer for initiating setting up of a dedicated bearer between the radio device and the CN for service level communication between a service client in the radio device and the at least two servers;
 install a filter for the dedicated bearer in accordance with the at least two address information elements; and
 map data traffic of the service level communication onto the dedicated bearer by means of the filter.

9. A non-transitory computer readable medium comprising computer-executable components for causing a network arrangement to perform the method of claim 1 when the computer-executable components are run on processor circuitry comprised in the network arrangement.

10. A non-transitory computer readable medium comprising computer-executable components for causing a radio device to perform the method of claim 6 when the computer-executable components are run on processor circuitry comprised in the radio device.

* * * * *